Patented July 25, 1944

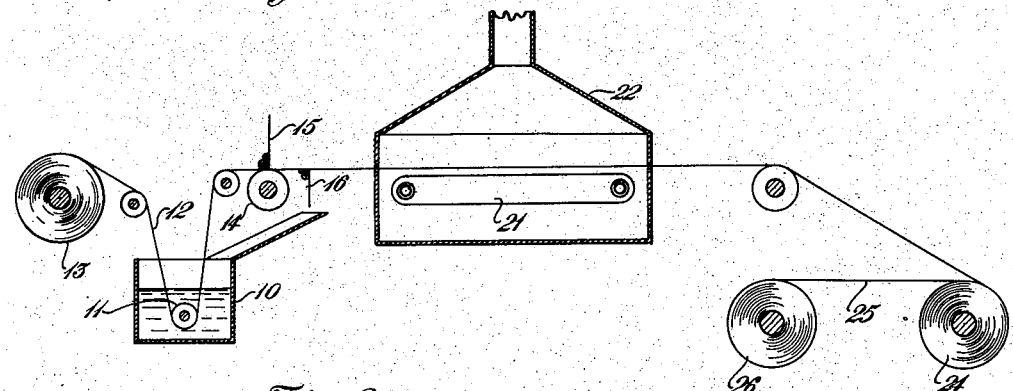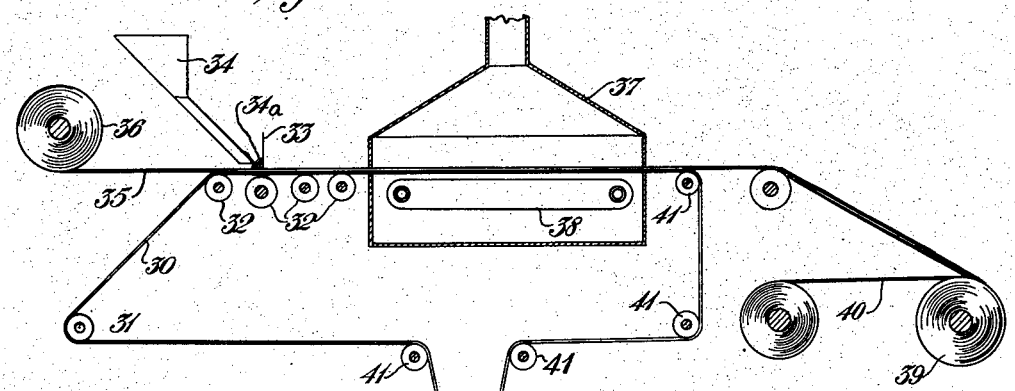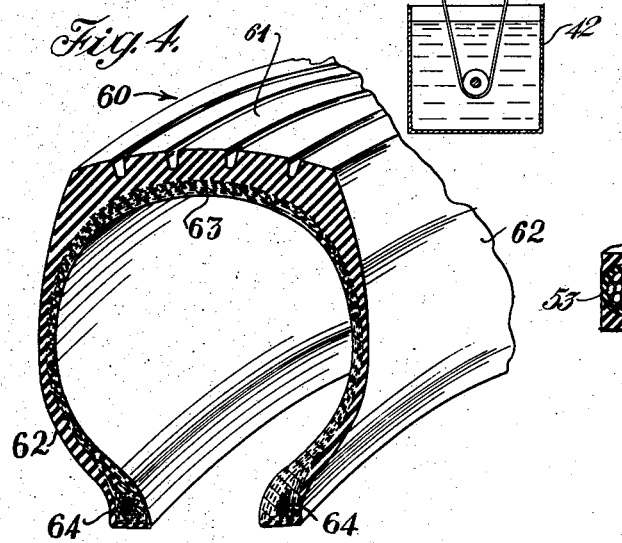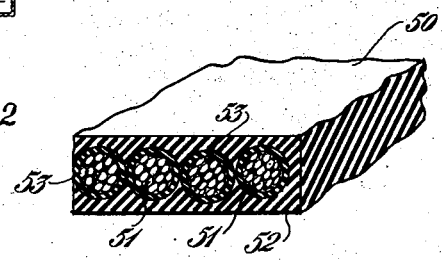

2,354,424

UNITED STATES PATENT OFFICE 2,354,424

METHOD OF MANUFACTURING TIRES

Charles K. Novotny and John T. Cox, Jr., Akron, Ohio, assignors to The Firestone Tire & Rubber Company, Akron, Ohio, a corporation of Ohio Application June 5, 1940, Serial No. 338,942

3 Claims. (Cl. 154—14)

This invention relates to the production of rubber pneumatic tires having the usual body and tread, but in which all of the rubber components are manufactured directly from latex instead of milled rubber, or from rubber which has been milled a minimum length of time.

Rubber tires, as made today, use reinforcing fabrics which have been covered with milled rubber by a process known as calendering, while other portions of the tires are made from rubber which has been milled extensively. Both calendering and milling of rubber involve use of bulky expensive machinery as well as costly labor operations. Then too, milling rubber for tire treads and other rubber components of tires breaks down the structure of the rubber particles and generally detracts from the natural and desirable physical properties thereof. Also, it is difficult to get a uniform coating of the milled rubber onto fabric so that any possible way of preventing the loss of the natural properties of the rubber and of simplifying the rubber coating of tire fabric obviously is to be desired.

The general objects of this invention are to reduce the cost of producing rubber tires, eliminate or substantially reduce the use of milled rubber in tires, and produce a tire in which the fabric coatings, tread, sidewall, gum strips and all other rubber components are manufactured directly from latex.

Other objects of the invention are to prepare a rubber coated fabric tire ply directly from latex; to place a thick, even, rubber coating rapidly upon the base fabric; to coat tire fabric with rubber by a positive depositing and gelling action; and to use rubber having its original nerve unimpaired in tire constructions.

Further objects of the invention are to eliminate or reduce the use of expensive and delicate machines and processes required to manufacture tire components by use of milled rubber.

The foregoing and other objects will be manifest from the following specification which is described with particular reference to the accompanying drawing in which:

Figure 1 is a diagrammatic view of apparatus which may be used for coating fabric in accordance with the invention;

Figure 2 is a similar view of a modified form of apparatus which may be used to practice the fabric coating process of the invention;

Figure 3 is a perspective view, partly in cross section, of fabric made in accordance with the invention; and, Figure 4 is a perspective view, partly in section, of a tire embodying the principles of the invention.

Broadly speaking, the present invention comprises the formation of rubber pnuematic tires in which the rubber components are derived directly from a latex dispersion instead of milled rubber. The rubberized fabric plies, used in the tire, are not only impregnated, but are also provided with a substantial skim coating of rubber deposited from latex. Preferably the latex, from which the tire is formed, is heat-sensitized so that a relatively thick layer of rubber can be rapidly deposited from the latex, and to aid in gelling the latex in the desired form. Use of triple centrifuged latex has also been found desirable to increase the adhesiveness of the rubber deposited.

"Latex" in the specification and claims is meant to mean any dispersion of rubber or rubber-like substances, although the invention is usually practiced by using natural rubber dispersions.

Since tires comprise treads, sidewalls, top cushion stock, coated fabrics, gum inserts and beads, the invention will be described with reference to the manufacture of these parts of a tire in order that the application of the invention to tire construction be fully evident.

In making a tread stock directly from latex, the first step is to mix approximately 15 parts carbon black, 16 parts of a pine tar-stearic acid emulsion, less than one part of a suitable wetting agent such as those sold under the trade names "Santomerse," or "Aresklene" (which are sulfonated decyl-benzene and dibutylated disulfonated ortho hydroxy diphenyl, respectively), and about 68 parts water together, and then the mixture is passed through a colloid mill in order to get a relatively good, or uniform, dispersion of the ingredients. The emulsion of stearic acid and pine tar usually comprises about five parts of stearic acid, about two parts of pine tar, and a small amount of ammonia sufficient to saponify about one part of the stearic acid. About 92 parts of water complete this emulsion which may be formed by passing the ingredients thereof through any desired ball or colloid mill.

After preparing this carbon black dispersion, it is added to diluted latex. The proportions which applicants have found desirable are: about 300 parts of latex of 36% dry rubber content, 1500 parts water and 475 parts of the carbon black master batch, the latex being diluted prior to adding the master batch thereto. It will be seen that the latex is in highly diluted form when the dilute dispersion of carbon black master batch is mixed therewith. One hundred parts of the carbon black master batch contain about 16 parts of solid material, while the dilute latex contains about six parts of rubber per 100 parts mixture. Then in mixing the two there is about five parts rubber and eight parts solids present per 100 parts mixture. This mixture may be agitated or passed through a colloid mill to mix same thoroughly without any danger of coagulation as the dilute latex is stabilized very well by the small portion of stearic acid and pine tar present and by the dilution of itself. Then, a solution of hydrated aluminum sulfate is mixed with the latex-carbon black mixture and agitated. The sulfate rapidly coagulates the rubber, after which the mixture is filtered or otherwise treated to obtain the coagulum.

Next the coagulum is washed and dried, after which the rubber is placed on a mill and milled a minimum length of time until the rubber becomes plastic, after which the rubber is sheeted from the mill, or, preferably, run through a tuber head to form tread stock. During the milling operation, sulfur, accelerator, zinc oxide, antioxidant, and/or other desired compounding ingredients may be added and mixed with the rubber, the milling dispersing the carbon black and compounding ingredients thoroughly. Sometimes a further amount of rubber is added to the carbon black-rubber batch when the further compounding ingredients are milled thereinto. This added rubber preferably is unmasticated rubber or rubber obtained by drying latex. Also, the rubber content of the batch might be increased in some instances by using a larger quantity of dilute latex in forming same, or by using a more concentrated latex.

The present process differs not only from general practice in that the reinforcing pigment is mixed with the rubber while in the form of latex, but it also differs from prior latex compounding processes in that applicants dilute the latex to about one-sixth of its normal rubber content before compounding it. Practice of the invention as outlined above results in the production of a compounded rubber stock having about 50 parts carbon black to 100 parts rubber, the ingredients being an intimate and uniform mixture due to their colloidal nature before coagulation. When only small amounts of, or no, rubber is added to the carbon black master batch in adding the other compounding ingredients thereto, a rubber stock containing as high as 70 parts carbon black to 100 parts rubber can be obtained. This amount of carbon black, while frequently desirable in the final product, usually cannot be compounded by milling rubber and black together as it requires too long a milling period, which reduces the strength of the rubber and gives it poor flexing properties. Also, the rubber may be scorched by the prolonged milling. Thus the present invention permits the compounding of larger amounts of carbon black with rubber, without impairing the properties of the rubber, than heretofore has been commercially possible.

When sidewall stock is to be made, a process similar to the tread making process is followed. In this instance, 13 parts of a 40% zinc oxide aqueous dispersion are added to 25 parts water and about an eighth of a part of "Darvan," which is a mixture of the sodium salts of polymerized alkyl-aryl-sulfonic acids, is added thereto. Then slightly less than one part of a 40% aqueous dispersion of titanium dioxide is added to the mixture obtained and the resultant composition is passed through a colloid mill to form the reinforcing pigment master batch. Latex is compounded with stearic acid and candelilla wax by forming an ammoniacal emulsion of these ingredients and adding them to latex. The emulsion comprises about three parts stearic acid, 15 parts wax, about 72 parts water, and a small portion of ammonia. About three parts of the emulsion of compounding ingredients are added to about 16 parts of 36% latex which has been diluted with 75 parts of water. This mixture is then passed through a colloid mill, after which it is mixed with the zinc oxide master batch and again passed through the colloid mill. Thereafter the dispersion is coagulated with an aluminum sulfate solution and the rubber filtered, washed, dried and milled until plastic, as before. In this case, the rubber is sheeted out on a calender to obtain a smooth and even sheet thereof which is used in tire construction in some manner as milled rubber sheeting. In this instance only about four parts rubber and about nine parts solids are present per 100 parts mixture when it is compounded and a stock containing substantially as much zinc oxide and titanium dioxide (total) as rubber is obtained. However, in making both the tread and sidewall, any desired amounts of suitable reinforcing pigments can be added to the latex.

The top cushion stock for the tire is prepared by mixing a zinc oxide dispersion with dilute latex having a small portion of stearic acid emulsion therein. This mixture is passed through a colloid mill, coagulated, filtered and treated generally in the same manner as in preparing sidewall stocks.

In coating fabrics in accordance with the invention, a heat-sensitized composition of approximately the following proportions was used: 166 parts concentrated latex (60% rubber), 4 parts zinc oxide (40% aqueous dispersion, 5.5 parts sulfur (50% aqueous dispersion), .5 part stearic acid, and 1.25 parts of diphenylguanidine has been found to give very desirable results. If another accelerator is to be used, then a special heat sensitizing substance, such as calcium sulfate, may also be compounded with the latex. Obviously the given proportions may vary with the type of fabric to be produced and other similar compounding ingredients may be used, when desired.

Referring now to Figure 1, suitable apparatus for coating fabrics with a latex composition is shown. This apparatus includes a dipping tank 10 which has latex of the foregoing composition in it to any suitable level and a roller 11 positioned adjacent the bottom of the tank 10. A suitable fabric 12, such as creel cotton cord used in tire construction, is wound upon a roll 13 and led from the roll 13 under roll 11 and then to a roll 14 which is positioned above the tank 10 and immediately under a doctor knife 15. Of course, the fabric 12 becomes covered with latex in passing through the tank 10. The doctor knife 15 is placed in a predetermined position, and is adjustable, relative to the roll 14 so that it exerts a slight pressure upon the fabric 12 or at least bears upon the upper surface thereof. Thus it functions to remove any excess latex from the top of the fabric 12. A scraper 16 is positioned adjacent the roll 14 to bear upon the under surface of the fabric 12 shortly after it passes under the doctor knife 15 and it removes any excess latex suspended from the undersurface of the fabric.

After the heat-sensitive latex is spread upon the fabric evenly, the fabric is drawn across a steam platen 21, in a dryer 22, which is heated to a temperature sufficient to produce rapid gellation, or coagulation of the latex carried by the fabric 12. Usually the platen is heated to a temperature of approximately 100° C. and, in all events, functions to coagulate and dry the latex rapidly so that a dry fabric having a rubber coating thereon is drawn from the exit side of the dryer 22.

From the dryer 22, the fabric is taken to a wind up roller 24 and preferably the convolutions of the rubber coated fabric 12 are separated from each other by a liner 25 which is pulled from a storage roll 26 and wrapped up with the rubber coated fabric 12.

To place all of the rubber desired on the fabric 12 by dipping the fabric into latex and then coagulating this latex on the fabric to form a rubber layer thereof, the process must be repeated until a sufficient thickness of rubber deposit is formed as one dip in latex does not coat the fabric to the desired depth for tire fabric. Usually three dips suffice to give the fabric the desired rubber coating.

Sometimes it is preferable to deposit sufficient latex on the fabric to form the desired rubber coating in one spreading operation. In that case, apparatus similar to that shown in Figure 2 may be used. Here a backing belt 30 is provided and is drawn from a guide roll 31 over a series of supporting pulleys 32. A doctor knife 33 is adjustably positioned a short distance above the pulleys 32 while a hopper or source 34 of latex, compounded according to the formula previously given, is provided to deposit latex 34a upon the backing belt 30 at the front side of the doctor knife relative to the motion of the backing belt. The fabric 35 is drawn from a roll 36 and placed upon the backing belt at the forward portion of the series of pulleys 32. Figure 2 shows that the fabric and backing belt are drawn or moved under the doctor knife 33 and in so doing the latex 34a fed upon the backing belt is distributed over the surface of the fabric. After passing under the doctor knife 33 the fabric 35, still upon the belt 30, is drawn through a dryer 37 similar to that shown in Figure 1. This dryer includes a steam platen 38 which is heated to a suitable temperature to coagulate the latex and dry the rubber so formed. The drying temperature and time are so correlated to the composition of the rubber that no appreciable vulcanization occurs during this operation. After the dried rubber coated fabric emerges from the dryer 37, it is pulled from the belt 30 and wound up on a suitable driven reel 39 with a layer of liner 40 between each convolution in a manner similar to that in Figure 1. The fabric 35 is tensioned appreciably by the pull thereon of the reel 39 so that during the drying of the latex the fabric retains its proper length and is not contracted by the drying rubber. This improves the properties of the fabric produced, particularly for use in tire construction as the fabric will retain its original length and will resist changes in the dimensions of the tire.

The backing belt is led over pulleys 41, through a cooling tank 42 and then back to the pulley 31.

By the use of the apparatus shown in Figure 2, it is possible to deposit a rubber layer of .055 inch in thickness upon the fabric in one operation, thus simplifying the coating process. Each side of the fabric may be coated separately when rubber is to be deposited on both sides thereof, as the cords of the fabric normally are close enough together to prevent the latex from striking through. On low count fabric, in which the cords are not close enough together to prevent the latex from passing therethrough, then the fabric should be dipped into latex, and dried to form a webbing between the cords before spreading latex thereon to facilitate coating the fabric. In all events, the latex impregnates as well as coats the fabric being processed.

Applicants particularly contemplate using the dry rubber coated fabric in tire construction. When used in this manner, it is necessary that the fabric be tacky, so that adjacent layers of fabric can adhere readily to each other to give the desired bond between the plies of the tire. One difficulty in latex coated fabrics is that they do not have quite the same amount of tack or adherency as fabrics coated with milled rubber by the well-known calendering process. It has been found that the adhesive properties of the fabric are improved by using thrice centrifuged latex. Apparently in the centrifuging operation, certain ingredients which reduce the tack of the rubber are withdrawn. Thus desirable results are obtained by the use of concentrated latex, while even more desirable results are obtained when the latex is centrifuged three times before compounding.

In coating fabric by the present process, it has been found desirable to treat the fabric with an adhesive composition, such as a latex-casein mixture, before applying the latex rubber coating thereto. The fabric may be dipped into the adhesive and then have a latex coating applied thereto either before or after drying the adhesive coating. In all events, the adhesive acts to improve the bond between the fabric and the rubber deposited thereon.

Figure 3 shows a greatly enlarged section of a rubber coated fabric 50 which has strands 51 embedded in a rubber deposit 52. The strands 51 have a coat 53 of adhesive therearound which acts to hold the strands together as well as to bind the rubber thereto. The rubber may be deposited onto the fabric by either of the foregoing methods.

The gum insert is prepared in a manner similar to the method of coating fabrics previously described. Here the latex composition, containing any desired compounding ingredients, including heat-sensitizing substances, is spread upon a belt similar to the belt 30. The belt then is drawn under a doctor knife after which the belt and the latex thereon is heated to produce coagulation. The rubber strip formed is dried carefully so as to drive the water therefrom without vulcanizing same appreciably.

Chafer strips, made from closely woven fabric, are used to wrap around the rubberized wires in the beads for the tire and are coated with rubber similarly to the fabric coating process previously described. Each side of the strip may be covered with rubber separately in the apparatus of Figure 2, or both sides of the fabric may be covered by a coating operation on the equipment illustrated in Figure 1.

In constructing a tire from the various stocks and fabrics prepared by use of latex rubber, it has been found that substantially no deviation from general practice need be made. Thus the tires are constructed and vulcanized in a manner similar to that used in manufacturing tires made from mill massed rubber which is compounded on a mixing mill, and forced into fabrics by calenders. It has been found that a tire constructed in accordance with the invention has improved properties over tires made in the regular manner where all of the rubber used has been masticated extensively.

In certain cases, it may be desirable to eliminate all milling of rubber used in the tire construction. Then more concentrated latex, which may be heat-sensitized, should be used in forming the tread, sidewall, and cushion stocks for the tire. These latices, after all of the compounding ingredients, such as the colloidal carbon black are added to and intimately and uniformly mixed with the latex, then could be coagulated on a belt similar to the belt 30 and cut to the desired form, or could be gelled in a mold, e. g. one having a tread design, or gelled in an extrusion head to form strips of rubber of the desired cross sectional form. In each case, the dried gelled strip, with or without fabric reinforcement, is assembled or laminated into tire form while the fresh surface of the rubber is still in an adherent condition. If vulcanized latex is used in the tire formation, then the tire only requires drying to be ready for use.

Figure 4 shows a tire 60, the individual portions of which have been formed in accordance with the present invention. The tire 60 possesses a conventional arrangement of parts, having a tread 61, sidewalls 62, 62, a body 63 and beads 64, 64.

It is seen that practice of the invention eliminates coagulating latex, milling the rubber obtained and finally calendering the rubber onto fabrics, as done in previous rubber coated tire fabric manufacturing practice. Also, other parts of the tire can be produced without the use of the usual acid coagulants, or with no, or minimum, milling of the rubber whereby the rubber obtained has very good physical properties. Thus not only the amount of equipment required to treat the rubber is reduced, but also appreciable reductions are made in the amount of power and labor required to produce a rubber tire. This, coupled with the improved structure and physical properties of the rubber tire obtained, makes the present process desirable from a commercial viewpoint.

In a further modification, an all latex rubber tire can be formed by gelling viscous latex in situ to form a rubber tire which thereafter can be vulcanized, or dried to produce a finished rubber tire depending on whether unvulcanized, or vulcanized latex is used in making the tire. The latex should be quite viscous in practicing this modified procedure of the invention, which viscosity usually is obtained by using highly concentrated latex. Then, viscous latex, containing compounding ingredients is spread or coated on a fabric and the coated fabric and a volume of compounded viscous latex are placed in a mold or otherwise brought to tire shape, after which the latex is gelled in situ to produce a tire. Unvulcanized latex having tire fabric therein can be gelled in cylindrical form, as in the standard drum method of building tires. Then the cylindrical rubber member obtained could be pressed to tire shape and vulcanized in accordance with standard tire manufacturing practice.

While a written description and illustration of a complete embodiment of the invention is disclosed herein, it will be understood that various modifications can be made without departing from the scope of the invention as defined in the appended claims.

What is claimed is:

1. A method of manufacturing a rubber pneumatic tire directly from latex, which includes the steps of coating tire fabric with a viscous latex composition and gelling the latex to form a coating of latex rubber on the fabric, drying and assembling the coated fabric with beads and other parts necessary to form a tire body, mixing compounding ingredients with latex to produce a compounded latex, gelling the compounded latex in the form of a tire tread, drying the wet tread to produce an unmasticated rubber tread, assembling the tire body and tire tread in the form of a tire while the freshly dried components are still in an adherent condition, and vulcanizing the tire.

2. A method of manufacturing a rubber pneumatic tire directly from latex, which includes impregnating tire cords with triple centrifuged latex, depositing a coating of rubber composition directly from a heat-sensitized triple centrifuged latex composition onto the impregnated cords to produce a skim coating of latex rubber thereon and forming tire plies from the impregnated and coated cords, mixing compounding ingredients with latex to produce a compounded latex, shaping and gelling the compounded latex in the form of a tire tread, drying the wet tread to produce an unmasticated rubber tread, assembling the tire plies and tire tread with beads and other parts necessary to form a rubber pneumatic tire, and vulcanizing the tire.

3. A method of manufacturing a rubber pneumatic tire directly from latex, which includes the steps of impregnating tire cords with latex, depositing a coating of rubber composition directly from a viscous latex composition onto the impregnated cords to produce a skim coating of latex rubber thereon, mixing latex with compounding ingredients including rubber reinforcing carbon black to produce a compounded latex, forming and gelling the compounded latex to produce an unmasticated latex rubber tire tread, assembling the rubber coated fabric and the tire tread in a tire, and vulcanizing the tire.

CHARLES K. NOVOTNY.
JOHN T. COX, Jr.